United States Patent [19]
Needham et al.

[11] Patent Number: 5,527,585
[45] Date of Patent: Jun. 18, 1996

[54] MOLDED STRUCTURE

[75] Inventors: Donald C. Needham, Ramona; William Kinzie, Cleveland; Bill V. Smith, Bartlesville, all of Okla.

[73] Assignee: Plastic Pallets, Inc., Bartlesville, Okla.

[21] Appl. No.: 353,718

[22] Filed: Dec. 12, 1994

Related U.S. Application Data

[62] Division of Ser. No. 166,139, Dec. 10, 1993, Pat. No. 5,405,567.

[51] Int. Cl.⁶ .................. B32B 3/00; B65D 19/00
[52] U.S. Cl. .................. 428/156; 428/131; 428/134; 428/136; 428/167; 428/178; 428/213; 108/53.1; 108/53.3; 108/55.3; 108/901
[58] Field of Search .................. 428/156, 178, 428/119, 120, 131, 134, 136, 167, 213; 108/53.3, 53.1, 55.3, 52.1, 901, 902, 55.5, 51.1; D34/38

[56] References Cited

U.S. PATENT DOCUMENTS

| | | | |
|---|---|---|---|
| D. 225,397 | 12/1972 | Lindley et al. | D12/16 |
| D. 258,948 | 4/1981 | Stump, Jr. | D12/53 |
| D. 259,189 | 5/1981 | Wilson et al. | D12/53 |
| D. 267,126 | 11/1982 | Jonebrant | D34/38 |
| D. 315,240 | 3/1991 | Sahm, Jr. | D34/38 |
| D. 355,064 | 1/1995 | Kinzie et al. | D34/38 |
| 4,389,814 | 6/1983 | Andreason et al. | 428/178 |
| 4,879,956 | 11/1989 | Shuert | 108/53.3 |

*Primary Examiner*—Donald J. Loney
*Attorney, Agent, or Firm*—Timothy R. Kroboth

[57] ABSTRACT

A novel molded structure especially useful as a rigid, load-bearing structure, is provided. Also provided is a novel process for molding the structure, which may be in the form of a pallet. By the process, the structure is chilled as it is being formed. Recycled resins including contaminants of limited compatibility may be used.

12 Claims, 4 Drawing Sheets

MOLDED STRUCTURE

This is a division of application Ser. No. 08/166,139, filed on Dec. 10, 1993, now U.S. Pat. No. 5,405,567.

FIELD OF THE INVENTION

This invention relates to molded plastic articles, and in particular to molding large articles from recycled plastics.

BACKGROUND OF THE INVENTION

Large plastic articles such as pallets and containers for shipping, require good load bearing properties and are typically flat. Recycled high density polyethylene is plentiful and therefore available at low cost, and beneficially imparts rigidity or stiffness; and is accordingly a desirable thermoplastic material for making this type of article.

Known methods for molding large plastic articles have significant limitations. High molecular weight polyethylene cannot be economically molded by injection molding. Blow molding is not suited for molding a solid thick wall part like a shipping pallet, which often may have a wall thickness of ¼ to ½" or more. Thick wall parts can be rotationally molded from medium molecular weight polyethylene; however, the time to heat and cool a part can run from 30 to 60 minutes.

In addition, available Post Consumer Recycled (PCR) plastics are often mixtures of limited compatibility. Illustrative is a mixture of high density polyethylene (HDPE) and lesser amounts of polyethylene terephthalate (PET) and polypropylene, which are constituents of soft drink containers. Another PCR plastic mixture includes HDPE and linear low density polyethylene (LLDPE). As may be understood, PCR plastic mixtures may range greatly in properties, for instance, density of from 0.915 to 1.20 gm/cc, melt flow of from less than 1 gm/10 min. to more than 30 gm/10 min., and melting point of from 270° F. to 480° F. The percent of shrinkage during cooling of an article made from such diverse mixtures may vary widely, resulting in poor physical properties and appearance due to stress, fatigue and/or delamination. The difficulties are even greater for large articles.

There continues to be a need for low cost, large plastic articles, in particular for large, rigid structures having good load bearing properties. Accordingly, an improved molding process that can take advantage of PCR plastic, especially recycled HDPE, would be beneficial. It would be especially advantageous if a rigid, thick-walled, load-bearing structure could be made at low cost from a PCR resin mixture of limited compatibility.

SUMMARY OF THE INVENTION

In accordance with the present invention, a novel molded structure is provided. Beneficially, for rigidity and to assist load-bearing, the structure includes a plurality of shaped hollows open to both outer surfaces of the structure, the hollows being formed by outer walls of the structure and by perpendicularly oriented ribs in structural connection with the outer walls. Advantageously, adjacent shaped hollows may open to opposite surfaces of the structure.

Beneficially, when the structure is to be used as a pallet, the structure may include foot portions, which may be removably mounted. Preferably, the foot portions may be hollow and open to an outer surface of the structure, and may include denesting abutments.

Also provided is a novel process for molding these structures, and in particular for molding large, rigid, thick-walled, load-bearing structures from recycled resins. By the process, a web of thermoplastic material is provided at a temperature near the second order transition temperature (glass transition temperature). A forming mold of a desired configuration is provided at a temperature below the glass transition temperature to rigidify the thermoplastic material rapidly after contact therewith. The web is positioned between the shaped members of the mold, and the mold is closed. Pressure is applied to force the web into the mold cavities.

By the process, the web is chilled as it is formed. Beneficially, shrinkage and resultant warpage are reduced or substantially eliminated, and improved load-bearing properties and appearance are provided.

Advantageously, the web may be provided near the glass transition temperature by extrusion. To this end, reverse temperature profile extrusion may be used.

Various thermoplastic materials may be used, including recycled mixtures including HDPE and resins of limited compatibility. Beneficially, the web includes a mixture of a stiffening matrix resin and an elongation-providing resin.

In the detailed description of the invention that follows, there are essentially described only preferred embodiments of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention.

DETAILED DESCRIPTION OF THE INVENTION

As indicated above, the present invention relates to molded plastic articles, and especially to large articles having good load bearing properties. Exemplary articles may have thick walled, rigid structures, and include pallets, panels for shipping crates and other containers, floor decking, wall sections and other heavy gauge articles.

Figure 3:
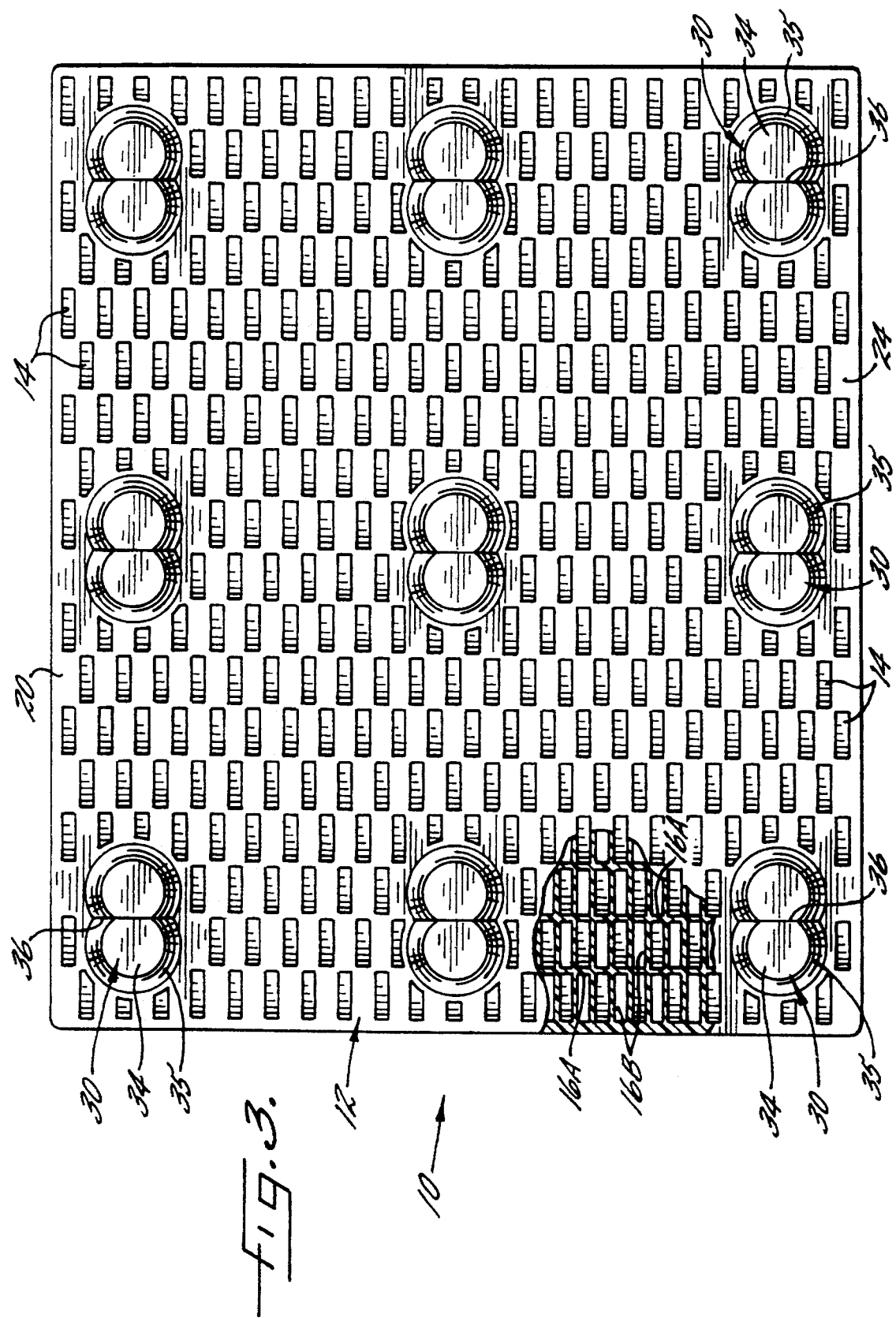
FIG. 3 is a bottom view of the pallet of FIG. 1, with a portion of the interior structure shown in cross-section.
Figure 4:
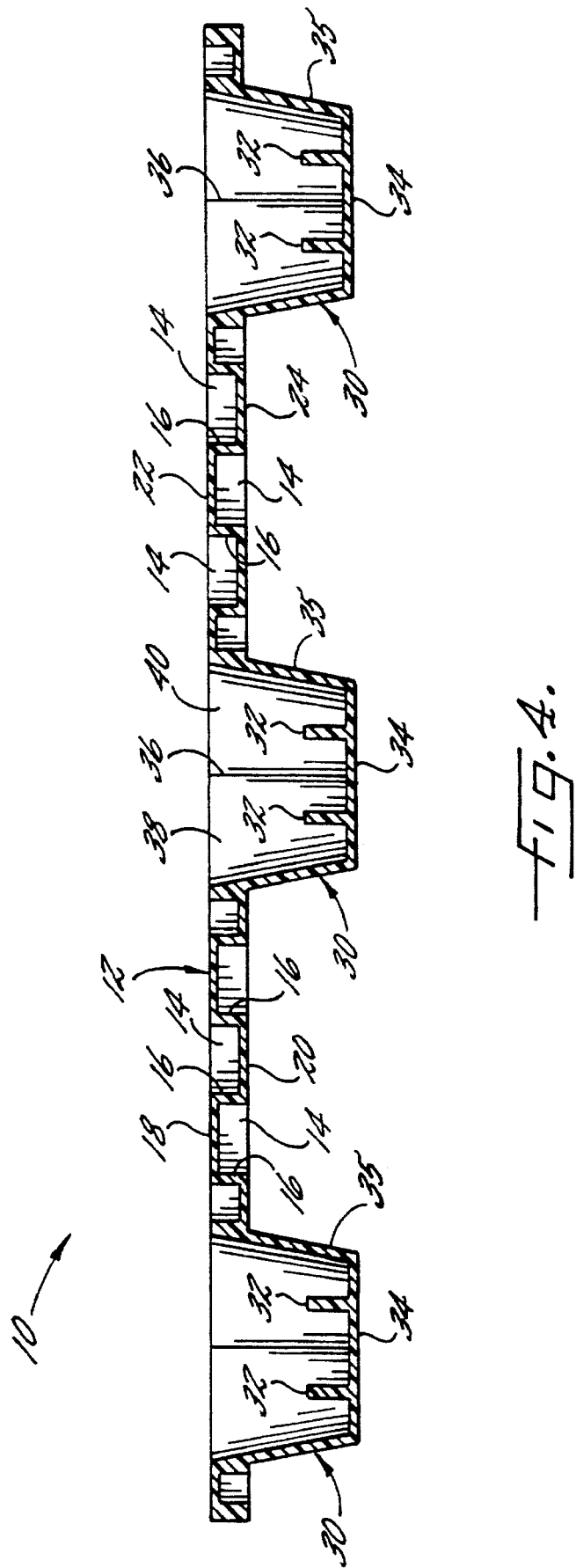
FIG. 4 is a cross-sectional view taken substantially along line 4—4 of FIG. 1.

Referring to the drawing, rigidity of an exemplary molded article 10 is enhanced by the use of offset standoffs in the top and bottom sections of a mold of the desired configuration to create a platform portion 12 having visually apparent, shaped hollows 14. With reference particularly to FIGS. 3 and 4, internally disposed within platform 12 are rib stiffeners 16, which beneficially are perpendicularly oriented with respect to, and structurally integral with, outer walls 18,20 of the platform. As can be understood, ribs 16 and generally planar, outer walls 18,20 cooperate to form shaped hollows 14. These shaped hollows may be a variety of shapes such as square, rectangle, hexagon, octagon and circular.

Figure 1:
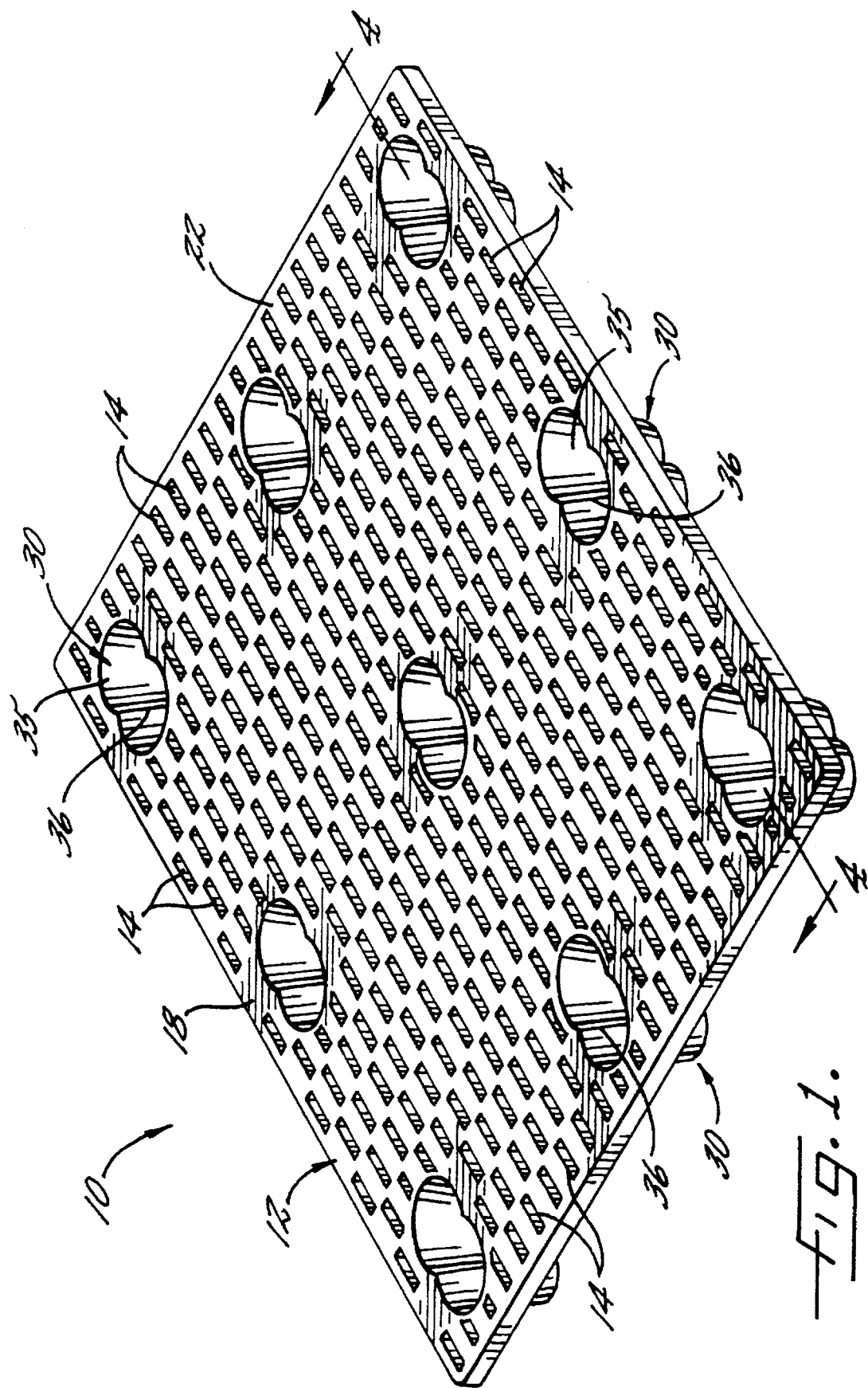
FIG. 1 is a top perspective view of a pallet in accordance with the present invention.

Referring to FIG. 1 also, shaped hollows 14 advantageously open to both surfaces 22,24 of the platform, and alternate in this respect, so that adjacent hollows open to opposite surfaces. Thus, approximately one-half of the reinforcing shaped hollows may open to top surface 22 and one half may open to bottom surface 24 to create a compression-strain ratio of maximum load distribution across the platform.

For greater rigidity, the thickness of a reinforcing rib may be the same as the outer wall thickness. When a rectangular hollow is used, it is typically beneficial, as shown in FIG. 3, for shorter ribs 16A to be thicker than longer ribs 16B, with about twice the thickness being generally preferred. Additionally, when the platform is rectangular, it is advantageous for the longer ribs to be generally in alignment with the longer dimension of the platform.

By such a structure, the rigid, flat platform of article 10 is provided with good load-bearing properties, which distribute the load across the width and length of the platform. Load is distributed on one side of the platform by compression of the ribs and by shear stress on the other side.

Illustratively, the vertical reinforcing ribs and outer walls will range from about one-eighth inch to about one inch in thickness. Preferred is a wall thickness of from about one-eighth to about one-half inch, with about one-fourth inch typically being most preferred.

Figure 2:
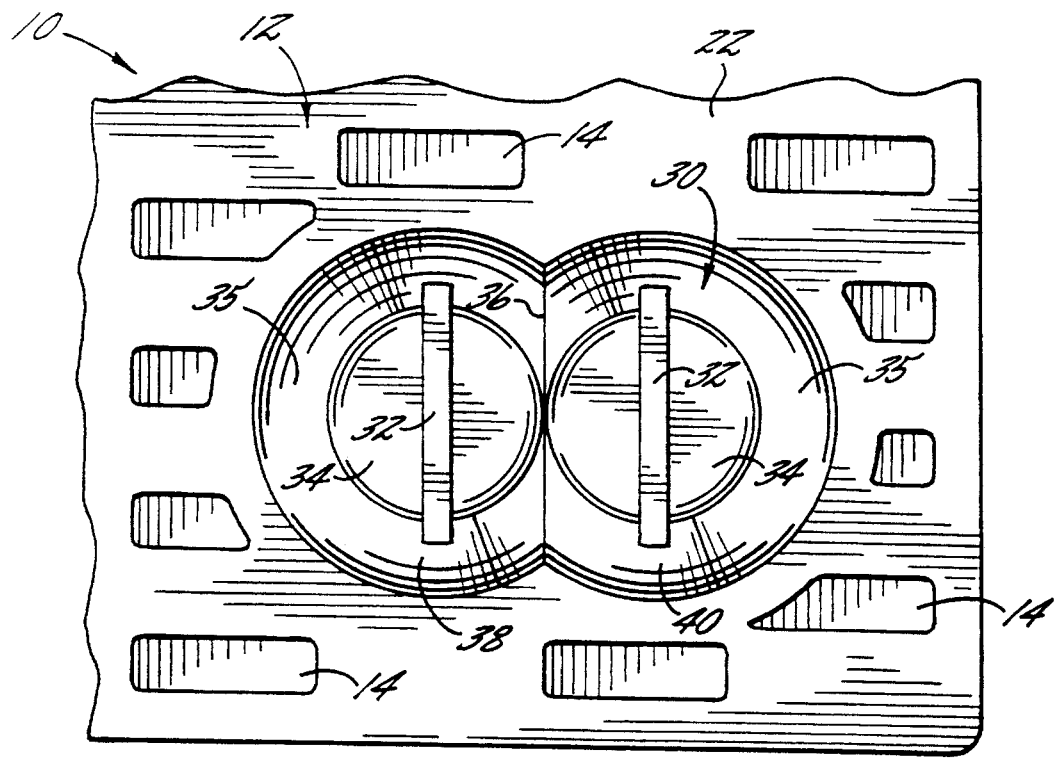
FIG. 2 is an enlarged top view of a corner portion of the load-bearing structure of FIG. 1.
Figure 5:
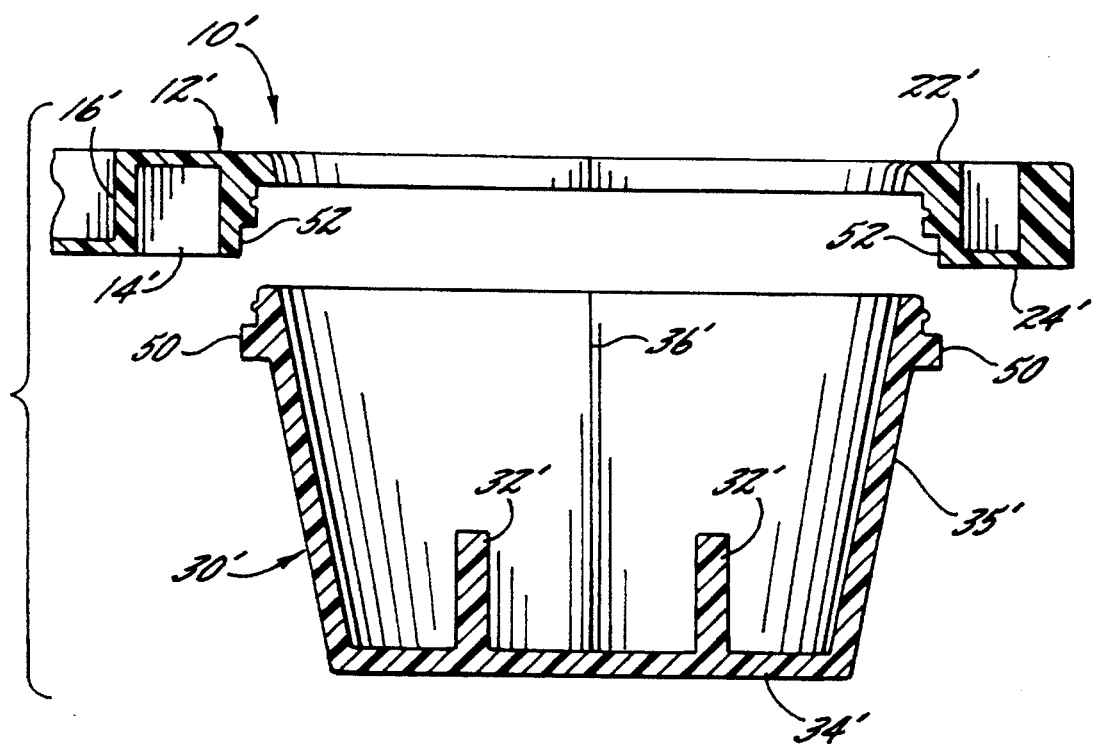
FIG. 5 is a cross-sectional view similar to FIG. 4, showing a portion of a modified pallet having removably mounted, foot portions.

With reference now also to FIG. 2, beneficially in the case of a pallet, article 10 includes foot portions 30, which may be integral with, or as shown in FIG. 5, removably connected to, platform 12. Advantageously, feet 30 assist mechanized handling of a pallet by a forklift. To this end, the feet may be provided with sufficient height for clearance between bottom surface 24 of the platform and a supporting surface such as a floor, and may form spaced apart columns across the platform to secure the pallet against shifting when for instance, supported by a forklift.

To provide for nesting of pallets, feet 30 may be hollow and open to top pallet surface 22. Denesting may be assisted by denesting abutments 32, which may be integral with bottom portions 34 of the feet. The denesting abutments are generally vertically disposed.

Each foot advantageously is formed by curved walls 35 that taper inwardly toward its respective bottom portion. For increased strength, each foot may be dual, with a seam 36 connecting individual foot portions 38,40; and each foot portion may have a denesting abutment.

Beneficially, as shown in FIG. 5, a foot portion 30' may be removably mounted onto a platform portion 12' so as to permit replacement. To the extent that the modified article of FIG. 5 is similar to the previously described article, corresponding numbers are used and the description is correspondingly abbreviated. Referring further to FIG. 5, foot assembly 30' may be provided with an external peripheral bead 50 shaped to mate with a recessed wall 52 of the platform, for locking onto the platform.

Beneficially, an improved molding process that can form large, rigid, thick-walled articles from PCR resin mixtures is also provided. Advantageously, the process may form such articles from recycled resins including HDPE and from resin mixtures of limited compatibility.

It has now been found that the foregoing structures may be readily attained by a process wherein a web of thermoplastic material is provided at a temperature near the glass transition temperature. Mating mold members are maintained at a temperature below the glass transition temperature to rigidify the thermoplastic material rapidly after contact therewith.

The temperatures utilized for the process will vary depending upon the particular thermoplastic material to be formed. Beneficially, the present process enables the forming of a thermoplastic material at a temperature below the molten temperature and at relatively high speed. Preferably, the material to be formed is at a temperature near the glass transition temperature, and accordingly may be at, or within about 5°–15° F. of, the glass transition temperature. Thus, the web may have a surface temperature about 5° to 15° F. below the glass transition temperature; and the internal temperature may be above the glass transition temperature. When using a crystalline thermoplastic material, molecular orientation may be obtained by use of temperature below the glass transition temperature.

The molding members are beneficially maintained at a temperature that rapidly chills the thermoplastic material upon contact, thereby setting the thermoplastic material in the desired configuration. The temperature of the mold may, of course, vary considerably depending upon the thermoplastic material employed and the temperature gradient required. Preferred temperatures for the mold will normally be below about 100° F., typically below about 75° F., to effect rapid setting of the thermoplastic material. By maintaining as great as possible a differential between the temperature at which the thermoplastic material is provided for forming, and the temperature of the mold, the thermoplastic material will be most rapidly rigidified, but considerations of economics and need for avoiding premature setting enter into the choice of the specific temperatures selected. However, temperatures on the order of about 20° to 50° F. may generally be used for the mold with a high degree of efficacy. Suitably, the mold temperature may be in the range of about 40° to 50° F., the exact temperature conditions varying with the temperature of the web and the desired speed of operation of the process.

When the mold is closed, the web is clamped about the periphery of the area to be formed and is maintained under tension during the forming operation. The molding members each have an external configuration or shape conforming to the desired configuration of the article to be produced, and most beneficially include means for being maintained at a temperature sufficiently low to rigidify the thermoplastic material on contact. Conveniently, chilling of the molding members may be by suitable coolant circulating through coils or conduits therein. The molding members may be at different temperatures, but will typically be at about the same temperature.

The pressure exerted during the forming may, of course, also vary considerably depending upon the thermoplastic material employed and the detail desired. A low pressure on the order of about 50 to 1000 psi will normally be used, with a pressure in the range of about 100 to 400 psi being usually sufficient to conform the material to the mold.

Advantageously, the residence time in the mold is selected to ensure rigidification of the thermoplastic material. The time may, of course, vary considerably depending upon the thermoplastic material employed, the temperature differential, and the pressure applied. Typically, five seconds up to about thirty seconds may elapse from the time the top of the mold contacts the resin to the time the necessary pressure has been applied and the material is rigid.

Advantageously, the web may be provided by an extruder prior to the forming step, and may be issued from the extruder at a temperature ready for forming. Accordingly, there is no need for an intermediate cooling step; rather, the web may be delivered directly from the extruder to the mold. In any event, prior to forming, the web is at a temperature near the glass transition temperature. Accordingly, since the process may be multistage, an extruding step may be included. Furthermore, conventional automated removal of a formed article from a mold may be advantageously provided.

As indicated, it is generally expedient to extrude the web at a temperature near the glass transition temperature. To this end, reverse temperature profile extrusion may be used. In other words, a higher temperature is used at the resin input end of the extruder than at the web output end. In this respect, a typical temperature differential will be on the order of about 100° to 200° F.

Advantageously, when the web is extruded prior to the forming step, the resin may be passed into an accumulator and discharged from the extruder by use of a ram. In this way, the charge may be measured and the extruder output controlled to meet demand.

Various thermoplastic materials may be employed in the present invention with preferred materials for reasons of economy, being available at low cost and thus being recycled resins. Especially useful, in making a rigid, load-bearing structure, are resins that impart rigidity or stiffness to the article formed; to this end, high molecular weight resins may beneficially be selected. In addition, crystalline resins are advantageously orientable to obtain greater strength. As can therefore be understood by one skilled in the art, recycled, HDPE is highly useful for rigid, load-bearing structures. Other exemplary thermoplastic resins are polyvinyl chloride, polyolefins such as polypropylene, polyesters such as PET, and acrylonitrile-butadienestyrene (ABS). Recycled cross-linked, HDPE may also be used.

Typically, the thermoplastic material will have a melt index ranging from about 0.01 to 10 gm/10 min., particularly for preparing a load-bearing structure. Preferably, a melt index of 2 or less may be used.

Various mixtures of recycled resins of limited compatibility and including a major amount of HDPE, may be used. By the term "limited compatibility" is meant that a resin mixture includes constituents that vary widely in physical properties such as density and melt flow, as a result of which the percent of shrinkage will ordinarily differ sufficiently to result in poor appearance and/or poor load-bearing properties due to for instance, stress, fatigue or delamination.

Preferably the thermoplastic material is a blend, and during the forming, one resin may function as the matrix and another resin may serve to provide elongation and prevent rupturing. One particularly useful type of mixture includes resins of distinct glass transition temperatures so that the resins crystallize at distinct temperatures. In processing a two resin blend of this type, the thermoplastic material to be formed is advantageously provided at a temperature near the glass transition temperature of the matrix resin component and sufficiently above the glass transition temperature of the other resin. In this case, the glass transition temperatures are distinct because the matrix resin crystallizes but the other resin does not significantly and thus provides elongation during the forming stage.

Another particularly useful type of blend includes a resin that may provide for elongation at a temperature below its glass transition temperature. Such a resin is exemplified by linear low density polyethylene. In another type of mixture, one resin may crystallize more rapidly than the other. In any event, it is desirable for the matrix resin to be under stress to increase stiffness and for a second resin to provide elongation so that rupture does not occur during molding. As can be understood by one skilled in the art, an appropriate graft polymer could include a portion that functions as the matrix and another portion that serves to provide elongation.

A suitable mixture includes about 50 to 75 wt. % of the matrix resin and about 25 to 50 wt. % of the elongation-providing resin. When HDPE is selected as the matrix resin and recycled, crosslinked HDPE is selected for preventing rupture, then an about 50/50 ratio may be used. However, when polypropylene, ABS, polyvinylchloride, or LLDPE is selected for elongation, the resin is usually limited to about 25% of the blend. PET is usually limited to about 10 to 50% of the blend due to compatibility.

In the example that follows and throughout this description, all parts and percentages are weight percent unless otherwise specified.

EXAMPLE

A resin mixture of 75% recycled HDPE (chopped milk jugs) and 25% recycled LLDPE (pelletized grocery bags) is fed to an extruder. HDPE has a glass transition temperature of 265° F. The extruder is set with a reverse temperature profile as follows: zone 1 (hopper), 450° F., zone 2, 400° F., zone 3, 350° F., zone 4, 300° F., and zone 5 (die), 260° F. A mold of desired configuration to produce a platform portion 12' having a total thickness of 1.0", is chilled to a web-contacting, surface temperature of 52° F.

A web of 0.752" thickness is issued from the extruder, and is determined to have a surface temperature of 254° F. and an internal temperature of 276° F. The web is draped over the lower mold member, and the mold members are quickly clamped together. The mold clamps the web firmly about the periphery of the area to be formed and maintains it under tension during the forming operation. A forming pressure of 245 psi and a forming time of 16 seconds are used. The mold members are separated, and the molded web is removed from the mold.

Forming platform 12' at a temperature near the glass transition temperature of the HDPE has been found effective to reduce shrinkage and beneficially will control warpage of large flat parts and improve appearance by preventing sink holes from forming along the sides of thick wall parts.

By comparison if a resin such as HDPE were hot molded, the structure might lose stiffness.

The present invention may be carried out with various modifications without departing from the spirit or essential attributes thereof, and accordingly, reference should be made to the appended claims, rather than to the foregoing specification as indicating the scope of the invention.

We claim:

1. A molded structure comprising a plurality of shaped hollows open to both outer surfaces of the structure, said shaped hollows being formed by outer surface-defining walls and a plurality of perpendicularly oriented ribs in structural connection with said walls, said shaped hollows having a relatively longer dimension of a certain thickness and a relatively shorter dimension of greater thickness than said certain thickness.

2. The structure of claim 1, wherein about one-half of said shaped hollows open to one of said outer surfaces, and about one half open to the other of said outer surfaces.

3. The structure of claim 1, wherein said walls are generally planar.

4. The structure of claim 1, wherein said relatively longer dimension of said shaped hollows is generally in alignment with a first dimension of said structure, wherein said hollows and said structure are rectangular in shape, and wherein said first dimension of said structure is the length of said structure.

5. The structure of claim 1, wherein adjacent hollows of said plurality of shaped hollows oppositely open to said outer surfaces.

6. A pallet comprising a rigid, load-bearing platform in accordance with claim 1, and further comprising a plurality of spaced apart, leg portions depending from said platform.

7. The pallet of claim 6, wherein said leg portions are hollow and open to one of said outer surfaces of said platform, and are provided with denesting abutments.

8. The pallet of claim 6, wherein said leg portions are removably mounted to said platform.

9. The pallet of claim 8, wherein each of said removably mounted leg portions comprises an upper portion shaped to mate with a peripheral wall of a correspondingly-shaped aperture of said platform.

10. A pallet comprising
a rigid, load-bearing platform having a rectangular shape and comprising a plurality of rectangular hollows open to both outer surfaces of said platform, said hollows being formed by outer surface-defining walls and a plurality of perpendicularly oriented ribs in structural connection with said walls, wherein a shorter dimension of said hollows is substantially thicker than a longer dimension of said hollows, and wherein said longer dimension is generally in alignment with the length of said platform.

11. The pallet of claim 10, further comprising a plurality of upwardly opening, hollow leg portions depending downwardly from said platform, and provided with denesting abutments.

12. The pallet of claim 11, wherein said leg portions are removably mounted to said platform, and wherein each of said removably mounted leg portions comprises an upper portion shaped to mate with a peripheral wall of a correspondingly-shaped aperture of said platform.

* * * * *